Feb. 11, 1969 J. WILLIAMS 3,426,645
ATTACHMENT FOR MAKING PERIPHERAL MASTER CAMS
Filed May 24, 1966

INVENTOR.
Judron Williams (Deceased)
BY Frankford Trust Company (Exr.)

Peck & Peck
ATTORNEYS

United States Patent Office 3,426,645
Patented Feb. 11, 1969

3,426,645
ATTACHMENT FOR MAKING PERIPHERAL MASTER CAMS
Judson Williams, deceased, late of Cornwells Heights, Pa., by Frankford Trust Company, executor, Philadelphia, Pa., assignor to Bertha Williams, Cornwells Heights, Pa.
Filed May 24, 1966, Ser. No. 552,641
U.S. Cl. 90—13.9
Int. Cl. B23c *1/16, 1/18;* B24b *17/00*
5 Claims

ABSTRACT OF THE DISCLOSURE

An attachment for milling machines for milling peripheral master cams from a constant motion pattern having linear pattern surfaces, a plurality of rotatable mounted work support means mounted on a movable table, the pattern being mounted on and movable with said table and the pattern being linearly movable in a direction perpendicular to the movement of the table, and means for transferring the linear pattern surfaces to the peripheries of the work.

---

This invention relates broadly to the art of attachments for milling machines whereby peripheral master cams may be milled, and in its more specific aspects, it relates to such an attachment whereby plane surfaces may be transferred or converted from an inclined plane form to a radial form; and the nature and objects of the invention will be readily recognized and understood by those skilled in the arts to which it relates in the light of the following explanation and detailed description of the accompanying drawings illustrating what is at present believed to be preferred embodiments or mechanical expressions of the invention from among various other forms, arrangements, combinations and constructions, of which the invention is capable within the spirit and scope thereof.

This invention is especially concerned with the provision of a relatively simple means in the form of an attachment for milling machines or the like, whereby a pattern is employed which is formed with inclined plane surfaces which are transferred by the mechanism of this invention from the pattern to the periphery of an element which is then milled in accordance with the pattern to provide one or more master cams having peripheral cam surfaces thereon.

The objects of the invention are broadly obtained by the use of a stylus, feeler or tracer which engages and in which swiveling movement is induced by the linear movement of the inclined surfaces of the pattern with respect thereto. Through hydraulic means, which are common and are known in the art, such swiveling or rocking movements of the stylus, in accordance with the inclined pattern surfaces, are transferred to a movable table of the milling machine, such movable table rotatively mounting the work, and such movements of the table combined with rotation of the work produces movement of the work toward and from a rotary spindle of a milling machine, to thereby form on the periphery of the work the desired cam surface in accordance with the pattern.

A further significant feature of this invention resides in the provision of a unique means for removably mounting patterns for movement in linear directions, so that the patterns may be changed with facility.

It is also a characteristic of this invention that the pattern in its linear movements is actuated simultaneously and by the same means which cause rotation of the work upon which the peripheral cam surface is being produced.

A further object of this invention is to provide an attachment for use with a variety of types of vertical milling machines in which the usual fixtures for the work are in part used for operatively mounting the attachment for the linear movement thereof.

While this attachment has been designed for use with several types of vertical milling machines, it is also intended to be provided as a unit for making, for instance, one master cam so that it is not limited in its use solely with milling machines having a plurality of work mounting fixtures thereon.

The attachment disclosed in this application may be used to produce substantially all of the basic shapes which are normally used in the production of master cams of this general character.

A relatively simple and economically produced mechanism is provided by this invention for converting the movement of the inclined pattern to a radial form on the periphery of the work.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawings.

Figure 1:
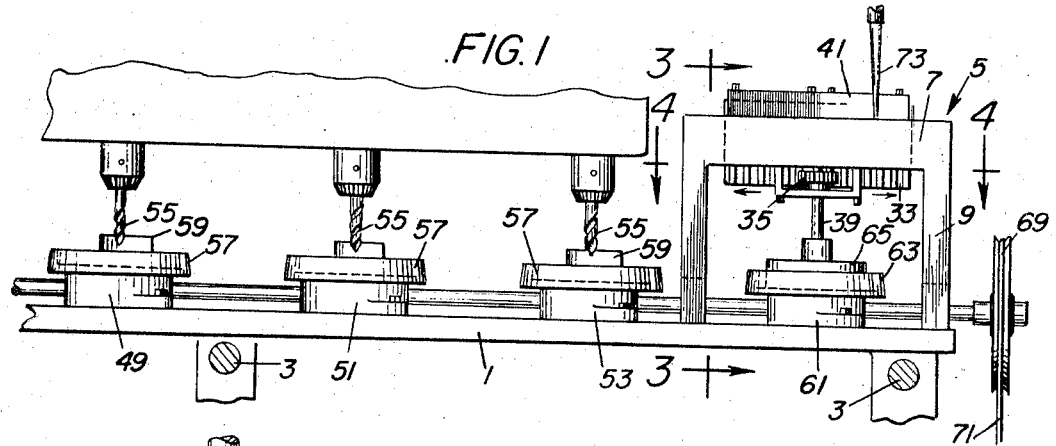
FIG. 1 is a view in front elevation of the attachment mounted on a milling machine and disclosing a plurality of the vertical spindles of the milling machine.
Figure 2:
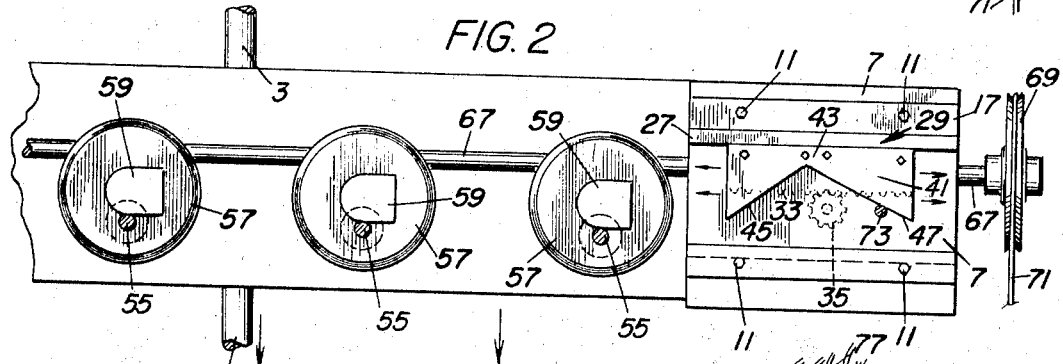
FIG. 2 is a top plan view of the apparatus disclosed in FIG. 1.
Figure 3:
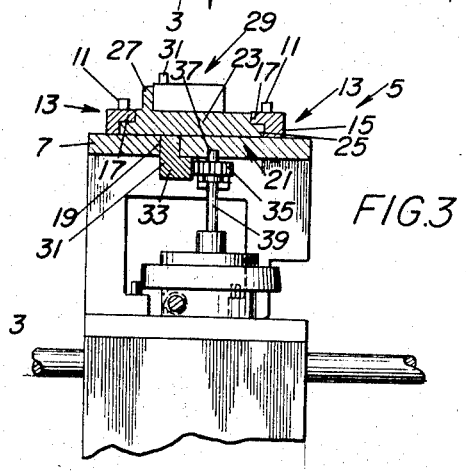
FIG. 3 is a detailed view taken on line 3—3 of FIG. 1.

In the accompanying drawings, I have used the numeral 1 to designate the movable table of a tracing miller having vertical spindles, as will be explained in detail hereinafter. The table 1 of the miller is mounted in any suitable manner, as on guide rods 3 upon which the table reciprocates in the direction of the arrows in FIG. 2.

The table 1 is caused to move hydraulically in accordance with the movements of a stylus which is in engagement with a sliding block which is provided with a pattern providing an inclined plane, as will be described in detail and made clear hereinafter.

A supporting table or platform designated generally by the numeral 5 comprises an upper sliding block supporting platform 7 which is mounted on legs 9 which in turn are mounted on the hydraulically operated reciprocable table 1.

Fastened to the top of the supporting platform 7 in any suitable manner, as by bolts 11, are a pair of spaced apart guide bars indicated generally by the numeral 13. These guide bars 13 which are mounted on the top of the supporting platform 7 are preferably, though not necessarily, of the same length as the length of the supporting platform. Each guide bar 13 comprises a body portion 15 through which the bolt 11 extends, such body portion being supported on the platform 7 and extending upwardly therefrom. Each guide bar 13 is formed with a flange or the like 17, such flanges 17 extending inwardly from the body portions 15 so that the flanges on each guide bar are directed toward each other. The flanges 17 are of less depth than the body portion 15 so that the under surface of each flange is spaced from the top surface of the supporting platform 7 to thereby provide a guide track between each flange 17 and the top of the platform 7. Approximately centrally of the supporting platform 7 is a longitudinally extending slot 19 formed therein, the purpose of which will be explained in detail hereinafter. A movable carriage or pattern platform supporting member designated generally by the numeral 21 comprises a body portion 23 which is preferably of less length than the length of the supporting platform 7 and is formed to slide along the upper surface of the supporting platform 7 between the two guide bars 13 in a manner as will be explained. Along each longitudinal bottom edge of the carriage 21 is provided a guide flange 25, each of which extends into the area between the lower surface of the flange 17 of the guide bar and the upper surface of the supporting platform 7 with a sliding fit therein. Thus, the pattern carrying member 21 may slide along the supporting platform 7, and in such sliding movements it is guided and maintained in proper position due to the fact that the flanges 25 extend beneath the flanges 17 of the guide bars 13. Extending longitudinally adjacent to but slightly removed inwardly from one edge of the pattern carrying member 21 is provided an upstanding wall element 27 which functions, as will become apparent, as a guide wall or the like for a pattern which is designated in its entirety by the numeral 29. This pattern 29 is seated on the upper surface of the body portion 23 of the pattern supporting member 21 in position against the upstanding wall 27 and is removably secured to the pattern supporting member 21 in any suitable manner as by bolts or the like 31.

The pattern block 29, which is removably mounted on the pattern carrying member 21 so that patterns of different shapes and forms may be attached thereto, moves, of course, with the pattern carrying member 21 as will be explained hereinafter. Fixed in any manner to the under surface of the pattern carrying member 21 and extending downwardly therefrom through the slot 19 in the supporting platform 7 is an actuating member 31 which is of a depth sufficient to extend downwardly and below the supporting platform 7. Fixed to the under surface of the actuating plow 31 is a rack 33 which is of somewhat greater width than the width of the actuating plow 31. Fixed in position in mesh with the teeth along one longitudinal edge of the rack 33 is a pinion 35 which may be journaled as at 37 in the under surface of the supporting platform 7, and at the opposite side thereof an operating shaft 39 is fixed to the pinion 35 and extends downwardly therefrom, and it will be evident that when the shaft 39 is rotated, the pinion 37 will be rotated to cause longitudinal movement of the rack 33 with a resultant sliding movement of the pattern carrying member 29 and the mounted pattern.

The pattern 29, in the particular example disclosed herein, comprises generally a block 41 which is formed with a center 43 from which inclined plane surfaces 45 and 47 outwardly diverge. It is these inclined planes or surfaces which it is desired to transfer to a workpiece for the milling of the periphery thereof to provide a cam surface on a master cam which is the result of the conversion of the movement of the inclined planes to a radial form on the workpiece as will be described hereinafter. It is thereby recognized and appreciated that patterns of various forms may be used, and that, of course, is the reason that each pattern block 29 is removably attached to the sliding pattern carrying member 21, and it will also be appreciated that curvilinear surfaces on the pattern could be employed.

Any suitable number of work supporting fixtures 49, 51 and 53 may be mounted on the milling machine table in position below a milling spindle 55 of a conventional vertical milling machine. Each fixture 53 mounts in any suitable or well-known manner a rotary work holding table 57, and the work 59 is suitably fixed to the upper surface of the work holding table 57 for rotation therewith.

A further milling machine fixture 61 is provided which is adapted, in a manner to be explained, to cause linear movement of the pattern supporting carriage 21 with its pattern 29 removably attached thereto. The milling machine fixture 61, which is also mounted on the movable milling machine table 1, mounts, in any suitable manner, a rotary table 63, and fixed to the upper surface of this rotary table 63 is a further rotary table 65 which is fixed to the table 63 and to which the shaft 39 is suitably attached for rotation therewith when the rotary table 65 is rotated.

Common means is provided for causing rotation of the rotary tables 57 and 63 at the same speed. This common means consists of a shaft 67 which is operatively attached to each of the tables 57 and the table 63 for rotation thereof when the shaft 67 is rotated. It is to be understood that any suitable means may be provided for connecting the shaft 67 to all of the rotary tables for rotation of the latter. Such means, if desirable, may comprise worms on the shaft 67 which are in mesh with pinions to cause rotation of these tables. At one end of the shaft 67, a pulley 69 is provided which is operated by a belt 71. This rotary table actuating means may be of the manual type or it may be powered. It will now be recognized that the rotary tables 57 and the rotary table 63 are all operated at the same speed.

Figure 5:
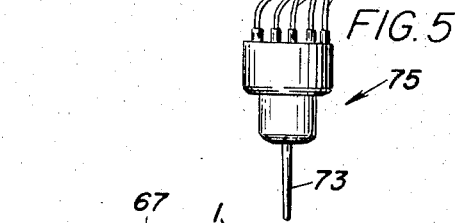
FIG. 5 is a diagrammatic view of the stylus and hydraulic mechanism.
Figure 4:
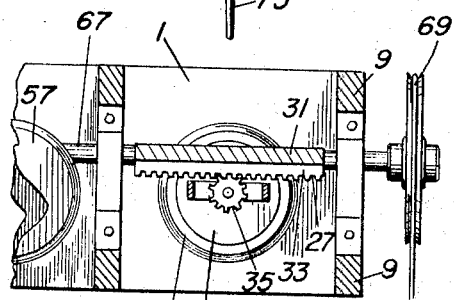
FIG. 4 is a view taken on the line 4—4 of FIG. 1.

A stylus 73 is provided and is positioned vertically in the path of linear travel of the pattern 29 so that as the pattern slides with its block in the supporting table 5, the surfaces 45 and 47 of the pattern will cause pivoting or swiveling motion in the stylus 73. This swiveling motion of the stylus in accordance with the contour of the pattern surfaces 45 and 47 is transmitted through conventional and well-known hydraulic means to cause reciprocation of the table 1 on its guide rods 3 in the direction of the arrows in FIG. 2. In FIG. 5 a diagrammatic showing has been made of the stylus which operatively extends from a valve box or the like 75 from which hydraulic tubes 77 extend and are in connection with further valve means (not shown) to cause operation of the milling machine table. It is not thought necessary to disclose in detail the hydraulic mechanism which is operated by the swiveling motion of the stylus to cause reciprocation of the table since this is well known in this art. As an example, this attachment has been successfully used with a TRUE-TRACE type of hydraulic mechanism.

It will now be appreciated that when the attachment is operating, the rotation of the table 65 will transmit rotary motion to the pinion 35 through the shaft 39 and will cause linear travel of the pattern supporting carriage 21 since the pinion 35 is in mesh with the rack 33 which depends from the pattern mounting carriage.

What is claimed is:
1. An attachment for milling machines for producing peripheral master cams from a pattern including, in combination, a milling machine table carrying rotary fixtures, certain of which mount the work to be milled radially to produce the radial peripheral cam thereon, said milling machine table being movable back and forth, a pattern supporting attachment mounted on said milling machine table and movable therewith, said pattern supporting attachment including a block and a pattern removably mounted thereon, said block being linearly reciprocable on said pattern supporting attachment in directions perpendicular to the directions of movement of said milling machine table, means causing linear movements of said block, and said means being operatively connected to one of said rotary fixtures and caused to rotate thereby, and means for rotating said fixtures and all of said fixtures being rotated at the same rate of speed, a stylus in engagement with and activated by the surface on said pattern as it moves, with the block, and the pattern induced movements in said stylus adapted to cause the movements in said milling machine table.

2. An attachment for milling machines in accordance with claim 1, wherein said first named means comprises a pinion connected to and rotated by said one of said rotary fixtures, and said block is provided with a rack in mesh with said pinion to cause linear movement of the block when said pinion is rotated.

3. An attachment for milling machines in accordance with claim 2, wherein said pattern supporting attachment is provided with a platform spaced upwardly and above said one of said rotary fixtures, a guide track being fixed to said platform extending in a direction perpendicular to the directions of movement of said milling machine table, and said block is slidably mounted in said guide track, said platform having an elongated slot therein disposed below said block, and said block having means extending through said slot carrying a rack in mesh with said pinion, whereby said block will have linear movements imparted thereto when said pinion is rotated.

4. An attachment for milling machines in accordance with claim 3, wherein said pinion is operatively connected to said one of said rotary fixtures in position spaced thereabove but below said platform.

5. An attachment for milling machines in accordance with claim 1, wherein said stylus is stationarily mounted for swiveling movement and is positioned in the path of linear movement of the pattern surfaces on said pattern.

References Cited

UNITED STATES PATENTS

| Re. 5,458 | 6/1873 | Minter | 90—13.6 |
| 513,039 | 1/1894 | Coupal et al. | 90—13.6 |
| 918,171 | 4/1909 | Kruse | 90—13.6 |
| 2,386,973 | 10/1945 | Mieth | 90—13.9 |
| 2,507,547 | 5/1950 | Shephard | 90—13.9 |
| 2,884,839 | 5/1959 | Steuby | 51—100 |

GERALD A. DOST, *Primary Examiner.*

U.S. Cl. X.R.

51—100